United States Patent [19]

Baker et al.

[11] Patent Number: 4,506,652
[45] Date of Patent: Mar. 26, 1985

[54] PIZZA OVEN

[75] Inventors: Edward D. Baker, San Francisco; Nils Lang-Ree, Los Altos; Ralph K. Johnson, Palo Alto, all of Calif.

[73] Assignee: Nieco Corporation, Burlingame, Calif.

[21] Appl. No.: 568,784

[22] Filed: Jan. 6, 1984

[51] Int. Cl.³ .............................................. A21B 1/44
[52] U.S. Cl. ............................. 126/21 A; 126/41 A; 432/142; 99/423; 219/388
[58] Field of Search ............... 126/19 M, 41 A, 21 A; 432/138, 142; 99/423; 219/388

[56] References Cited

U.S. PATENT DOCUMENTS 3,552,299  1/1971  Patoka ................................. 219/388
4,305,329  12/1981  Fenoglio .............................. 432/142

Primary Examiner—Carroll B. Dority, Jr.
Attorney, Agent, or Firm—Limbach, Limbach & Sutton

[57] ABSTRACT

An oven for heating foodstuffs, i.e. cooking pizza, has a heated enclosure substantially L-shape in plan to leave an exposed sector. A rotor is turned intermittently by power to carry pizzas from the exposed sector, through the heated enclosure and back to the exposed sector. In the heated enclosure the pizzas are baked by a stream of heated and reheated air circulated in a closed path.

5 Claims, 14 Drawing Figures

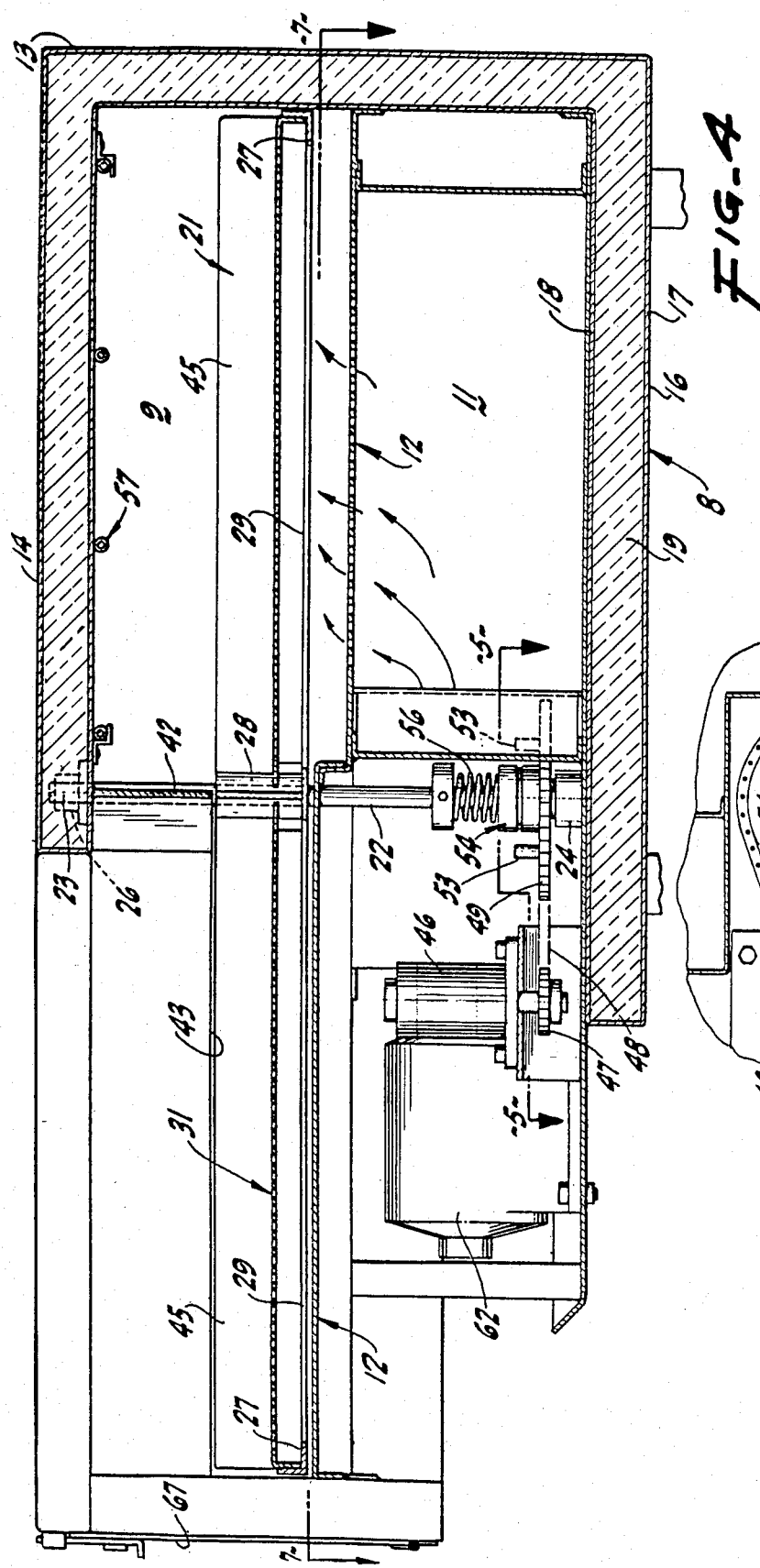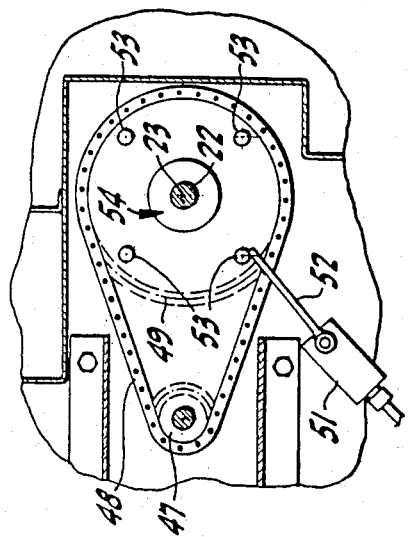

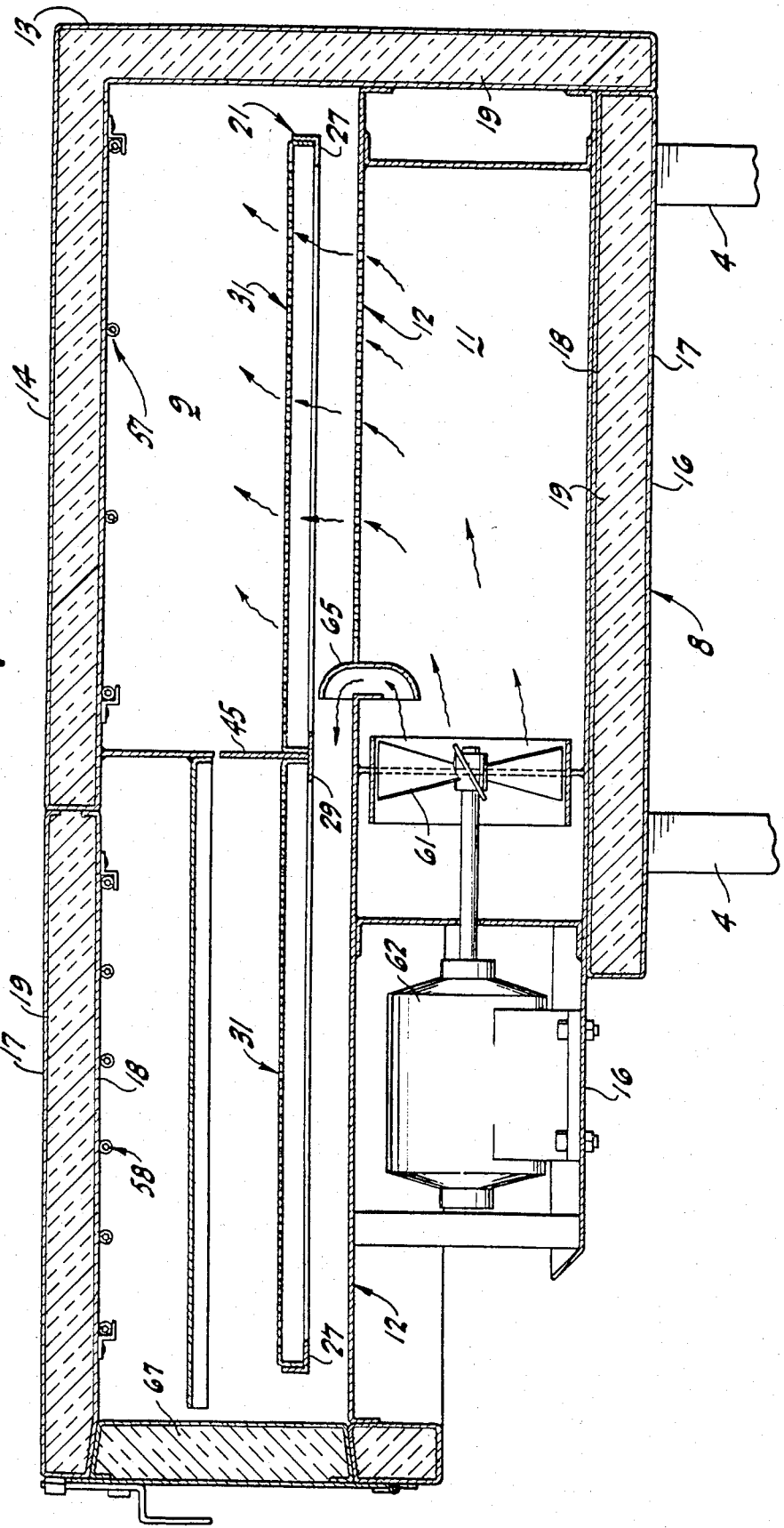

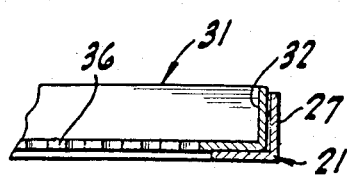
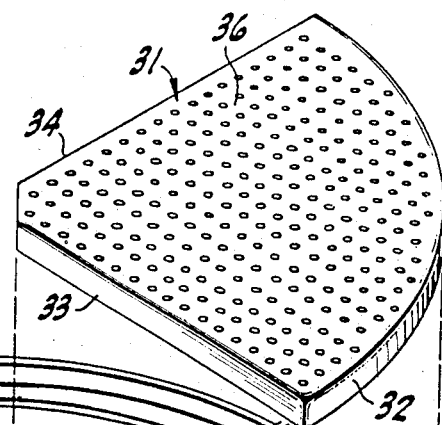
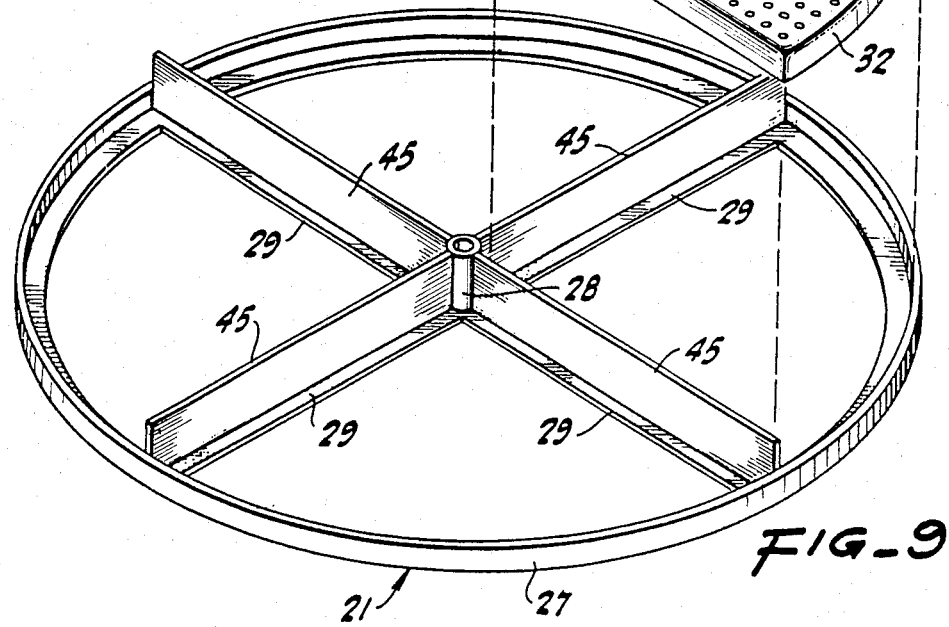
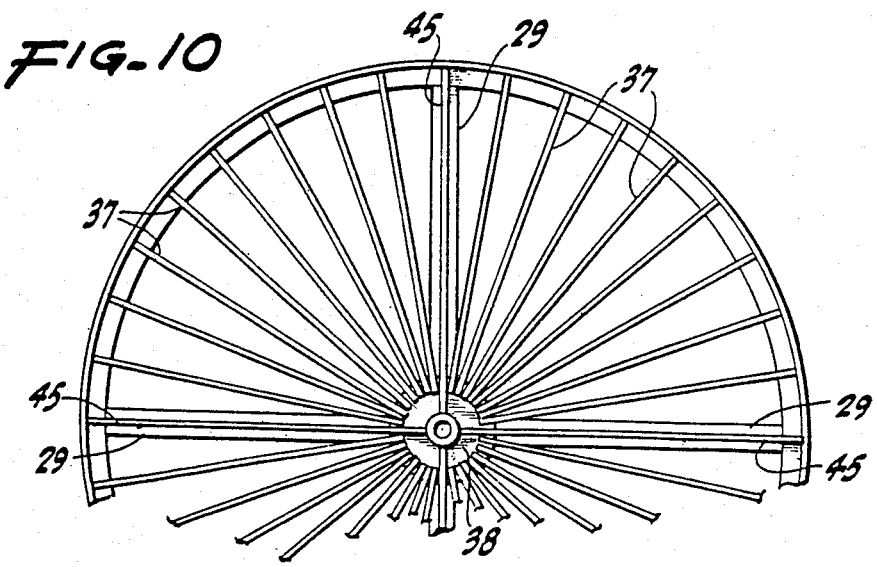

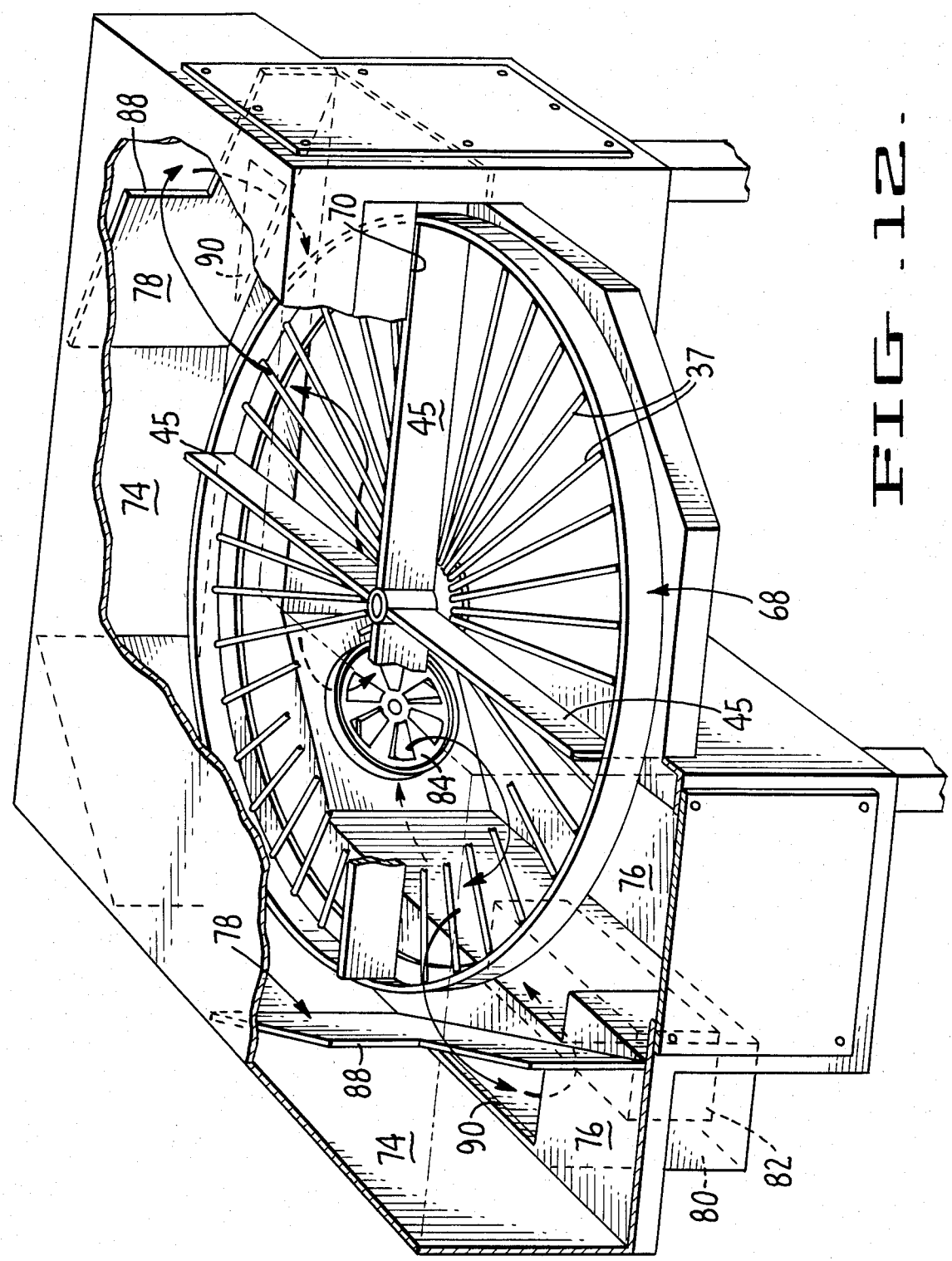

PIZZA OVEN

BACKGROUND OF THE INVENTION

A wide variety of commercial ovens have been designed for various purposes, but Applicants are unaware of any ovens which are particularly designed for high volume, uniform production of pizzas.

In accordance with this invention Applicants have developed an oven specifically adapted for the high volume, uniform production of pizzas in the pizza restaurant environment where the oven is used to bake a continuous mixture of pizzas of different kinds and sizes while the oven is required to handle large production comfortably for a pizza chef.

In the preferred form of oven of this invention, the oven has a baking chamber, a fan and heaters so arranged as to provide a forced draft of heated and reheated air along a closed path through the chamber. A pizza supporting turntable is mounted for rotary movement intermittently with a portion of the turntable located outside the baking chamber where it may be loaded and unloaded by the pizza chef. The turntable cooperates with the walls of the chamber to seal the chamber so that the heated air stream is confined during the period between intermittent movement of the turntable.

The oven is preferably provided with automatic controls for advancing the turntable at adjustable predetermined intervals.

BRIEF DESCRIPTION OF THE DRAWINGS

FIG. 4 is a cross-section, the plane of which is indicated by the line 4—4 of FIG. 2, the scale being enlarged.

FIG. 5 is a cross-section, the planes of which are indicated by the line 5—5 of FIG. 4.

FIG. 6 is a cross-section, the plane of which is indicated by the line 6—6 of FIG. 2.

FIG. 9 is an isometric perspective view of the rotor with one grid shown in an elevated position.

FIG. 10 is a plan of the rotor with a different form of grid thereon.

FIG. 11 is a fragmentary view comparable to a part of FIG. 4 but with the grid in an inverted position.

FIG. 12 is a perspective view, partially broken away, of a preferred form of oven of this invention.

DETAILED DESCRIPTION

Figure 1:
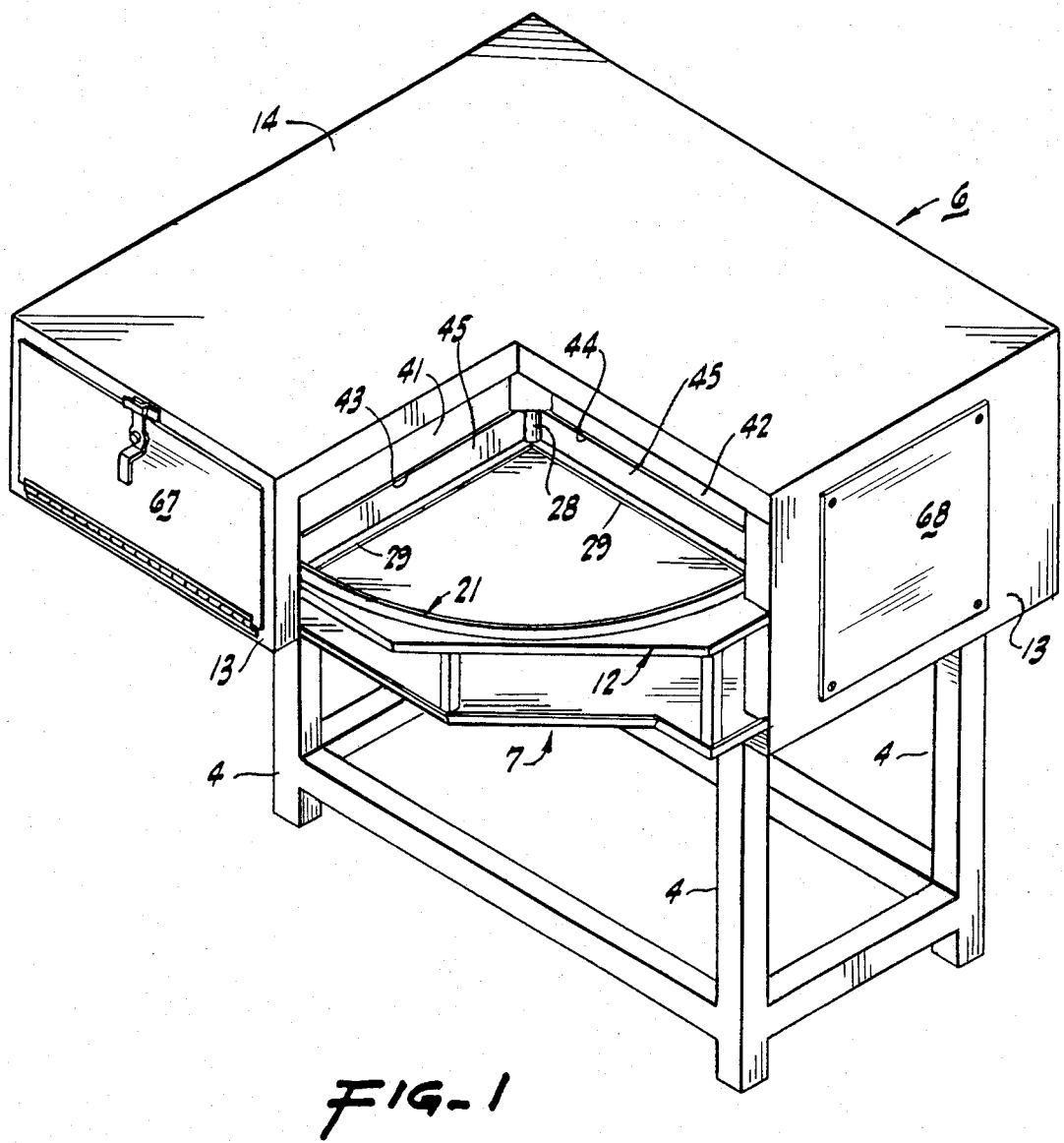
FIG. 1 is an isometric perspective, some portions being diagrammatic, of the progressive oven of the invention.
Figure 2:
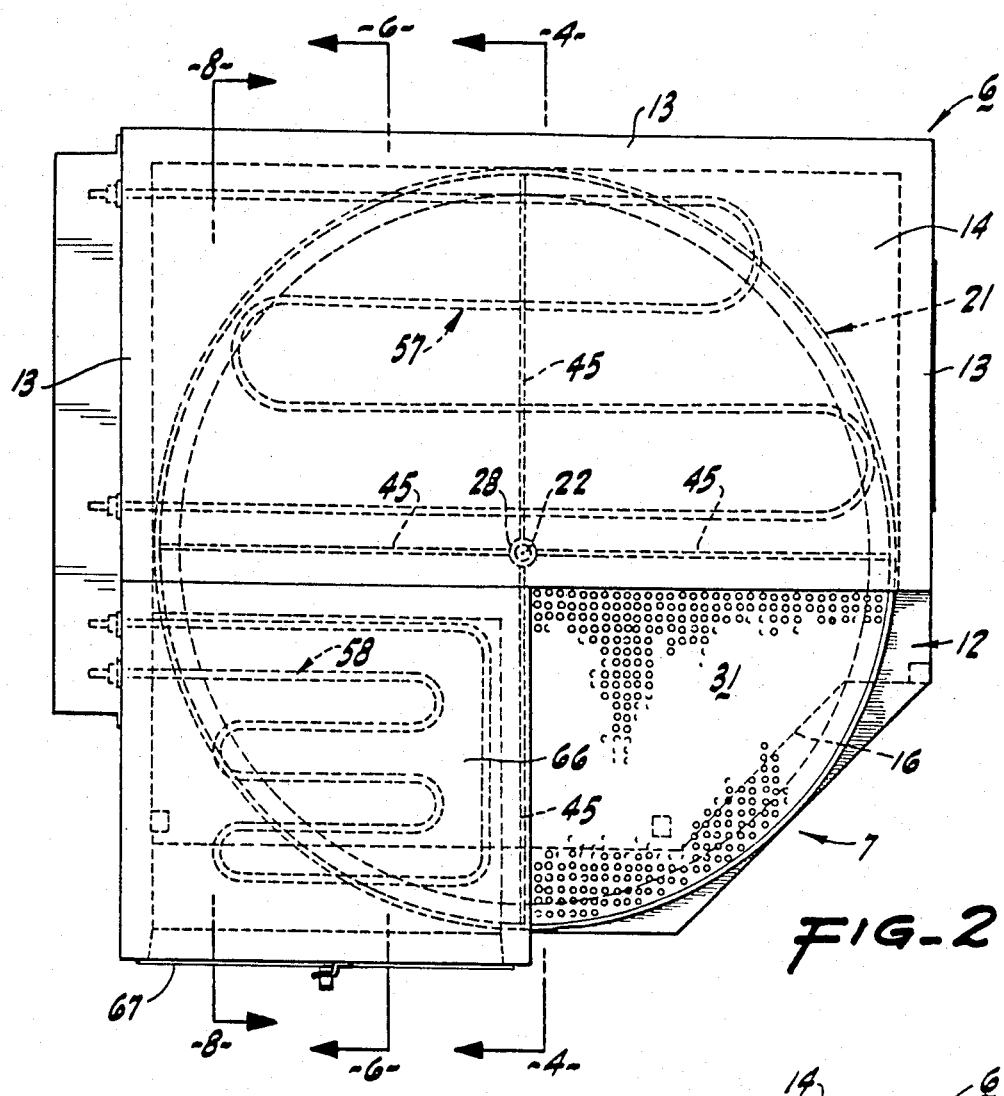
FIG. 2 is a plan of the progressive oven constructed pursuant to the invention.
Figure 3:
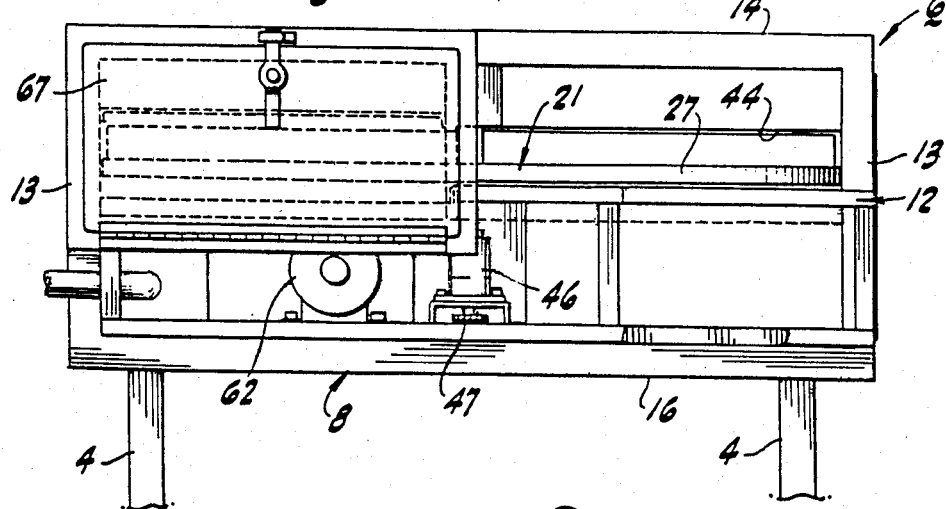
FIG. 3 is an end elevation of the oven as illustrated in FIG. 2.
Figure 7:
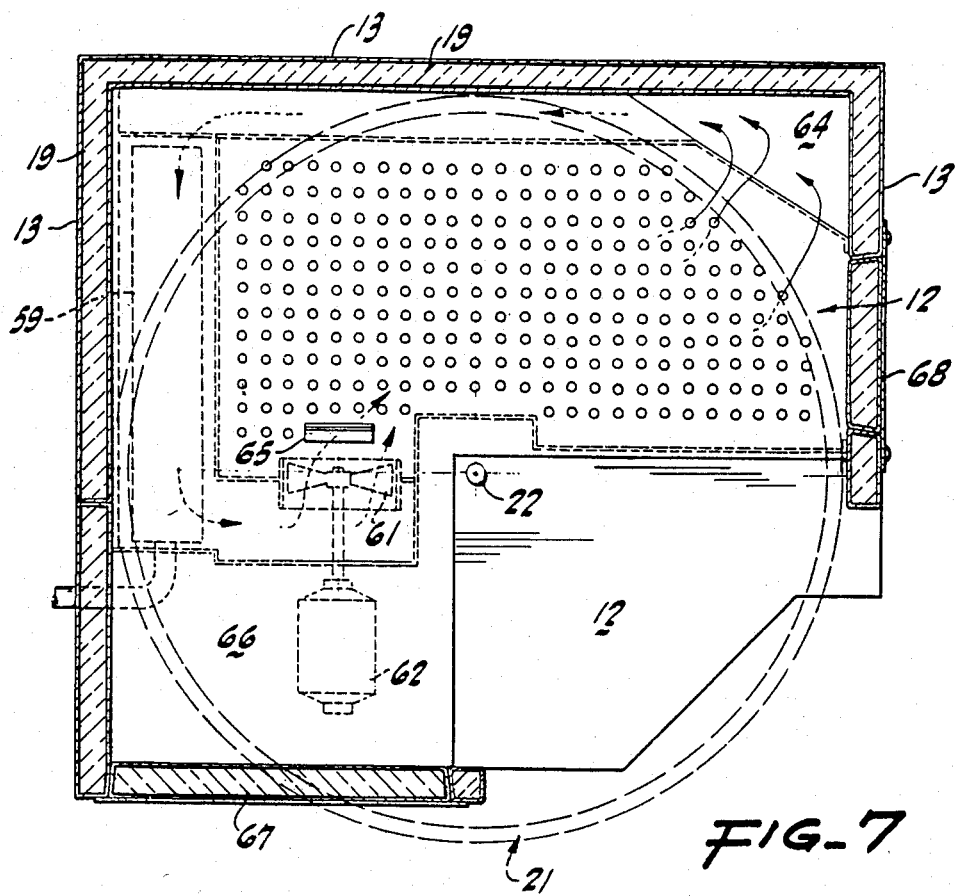
FIG. 7 is a cross-section, the plane of which is indicated by the lines 7—7 of FIG. 4.
Figure 8:
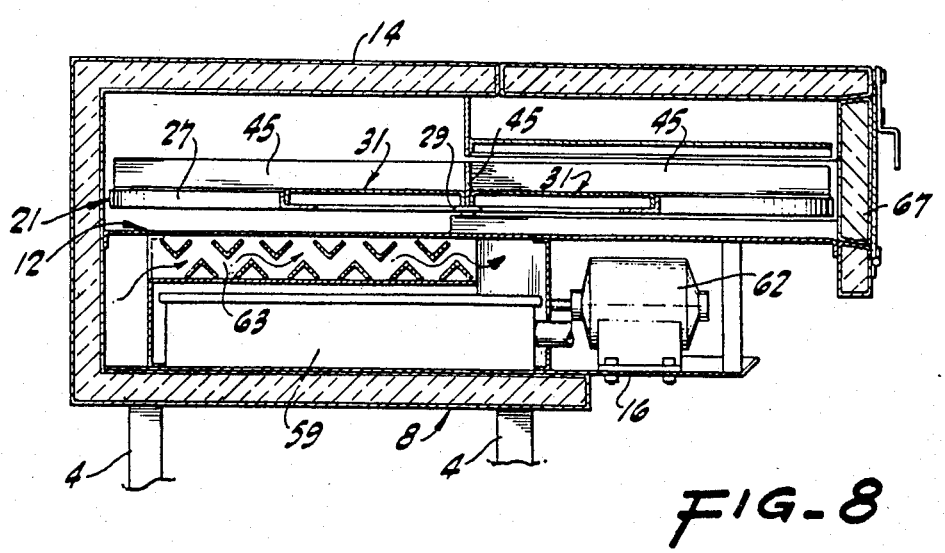
FIG. 8 is a cross-section, the plane of which is indicated by the line 8—8 of FIG. 2.

There are many instances in which it is desired commercially to change the temperature of foodstuffs; for example, to heat pizza either from a frozen condition or from room temperature to a suitable temperature for appropriate cooking and for eating.

For this reason and in order to provide a simple, reliable and effective mechanism which can easily be operated by almost anyone, there is provided a device as disclosed herein.

Resting on legs 4 at about waist height is an enclosure 6 substantially rectangular in plan and with a truncated corner 7. The enclosure has a frame 8 and is divided into an upper chamber 9 and a lower chamber 11 by a substantially planar, partially perforated intermediate sheet 12. The enclosure includes side walls 13 as well as a top wall 14 and a bottom wall 16. These walls typically are made up of an outer sheet 17, an inner sheet 18 and intermediate thermal insulation 19.

Disposed just above the intermediate sheet 12 is a rotor 21 secured to a shaft 22 having a vertical axis 23 and mounted in a lower bearing 24 and an upper bearing 26 fixed on the frame 8. The rotor has a circular hoop 27 angular in cross-section and joined to a hub 28 on the shaft 22 by a number of radial spokes 29 also angular or inverted T-shape in cross-section. The number of spokes is chosen to divide the rotor into any selected number of sectors; in this case, four sectors, so each sector spans ninety degrees.

Adapted to rest detachably in the individual sectors are basket-like grids 31 (FIG. 9) each having an angle rim 32 and angle arms 33 and 34 as well as a perforated or openwork support 36. The grids can be rested on the hoop 27 and spokes 29 either in an upright position, as seen in FIGS. 4 and 9, or in an inverted position as seen in FIG. 11. The grid supports 36 instead of being perforated plates may be formed of radial rods 37 fastened at their inner ends to and removable with segments 38 (FIG. 10).

The rotor 21 is only partially enclosed in the upper chamber 9 since there are radial side walls 41 and 42 in vertical alignment with the radial boundaries of the particular sector that is symmetrical with the truncated corner 7. The radial walls 41 and 42 are continuous with their adjacent side walls 13 and similarly merge with the top wall 14. The radial side walls 41 and 42 do not extend downwardly to the grids 31, but rather terminate a substantial distance above the rotor 21 to define openings 43 and 44 just sufficient to pass or clear the upstanding walls 45 of the T-shaped spokes 29.

Means are provided for rotating the rotor 21, preferably in an intermittent fashion, so that successive sectors are in turn left exposed and then advanced into and through the closed upper chamber 9.

For this reason, a rotor drive motor 46 is mounted on the frame 8 (FIGS. 4 and 5) and through gearing 47 and a drive chain 48 rotates a chain sprocket disc 49 connected to the shaft 22. The motor 46 is in a suitable electric circuit (not shown) including a timer and a mechanically actuated, spring return switch 51. A switch actuating lever 52 is in the path of actuating rods 53 upstanding from the sprocket disc 49 and spaced according to the angular spacing of the spokes 29 (FIG. 9). The disc 49 is coupled to the shaft 22 through a friction clutch 54 urged into driving engagement by a spring 56. While the disc 49 and the shaft 22 can be rotated relative to each other by a superior force, they are normally set so that they move together in the desired phase relationship.

When the motor 46 is initially energized, preferably by a manual off-on switch (not shown), the disc 49 and the shaft 22 are turned to advance the rotor 21 until the switch lever 52 is actuated by an advancing rod 53 to interrupt the circuit to the motor 46 and simultaneously start an adjustable timer (not shown). Preferably, the timing is such that the circuit to the motor is interrupted and the rotor 21 is stopped with both of the openings 43 and 44 virtually blocked at the same time by two of the spokes 29. This blocking segregates the exposed quadrant of the rotor 21 from the three remaining quadrants within the upper chamber 9. At the expiration of the selected time period for rest, the timer again energizes the motor 46 and the rotor 21 is advanced through another quarter turn.

It is desired to maintain the interior of the enclosure 6 at other than atmospheric temperature. Since the present embodiment is an oven, the interior temperature is raised, but if freezing or cooling is desired, the temperature of the enclosed space is lowered below atmospheric temperature by cooling coils. Herein, radiant heater elements 57 and 58 are fastened to the top wall 14 and within the enclosed three-quarters of the housing 6. Also, a gas heater 59 is installed in the lower chamber 11 to afford a supply of warm air circulated by a fan 61 driven by an electric motor 62. The air is gently forced over a heat exchange labyrinth 63 and through the upper chamber 9 and back through an opening 64 in the intermediate sheet 12 to the lower chamber 11 and heater 59 in a closed path.

The circular rotor 21 in the rectangular housing leaves an unoccupied, corner portion 66 of the intermediate sheet 12 useful as a heating space for storage items. A diverter 65 (FIG. 4) directs warm air to flow toward the corner heating space. A door 67 in a side wall 13 affords access to the corner portion 66. The door also is useful for inspection, as is a similar removable panel 68 near another corner of the enclosure.

In operation, the gas-air heater 59 and the electric radiant heaters 57 and 58 are energized. When the internal temperature is appropriate, items for heating or cooking are individually deposited on the grid 31 in the exposed sector or quadrant. The motor 46 is then energized, and the rotor 21 is advanced to introduce the deposited items into the heated enclosure and to present in the exposed sector a grid that is empty for loading or contains previously processed items for unloading. Once started, the rotor 21 can be left to advance automatically and intermittently one sector at a time with intervening rest periods in effect to heat successive items over the desired period of time. Alternatively, the rotor can at any time be prevented from advancing from a stopped position or from any position by opening the circuit to the motor 46. Even though the motor 46 shortly after deenergization comes to a stop substantially in a rest position with the spokes 29 blocking the openings 43 and 44, the rotor 21 can be manually rotated out of such rest position by slipping the friction clutch 54. This can also be done by manually operating the motor energizing switch on and off at will. If the rotor becomes jammed for any reason, the clutch 54 yields to avoid injury.

Figure 13:
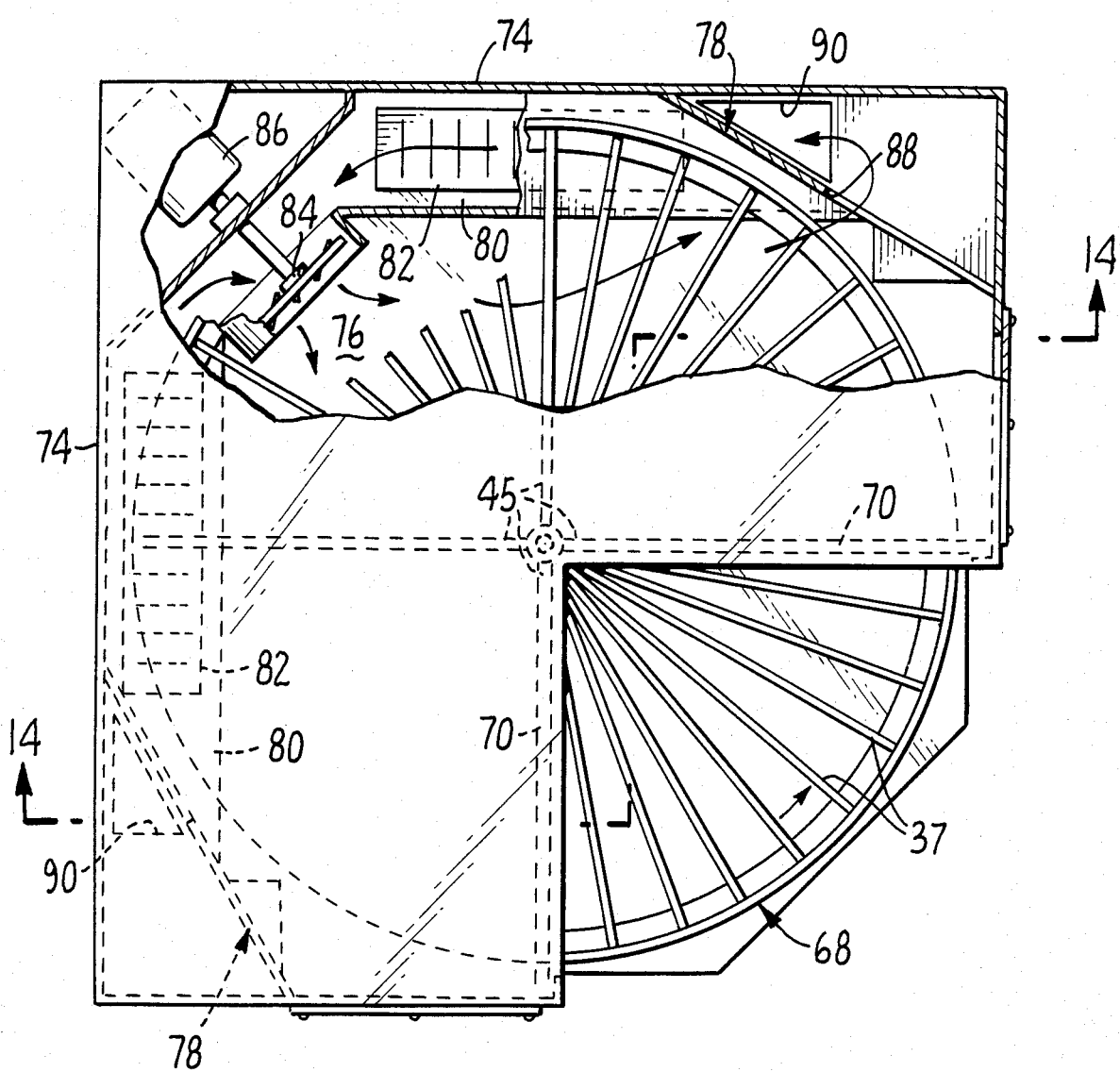
FIG. 13 is a plan view, partially broken away, of the oven of FIG. 12.
Figure 14:
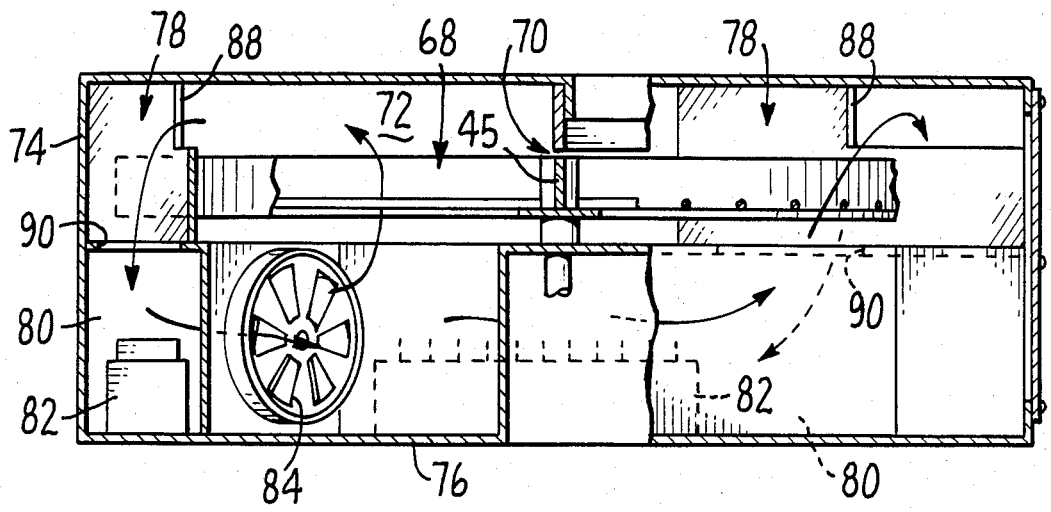
FIG. 14 is a vertical sectional view along the bifurcated plane indicated at 14—14 in FIG. 13.

In the preferred form of pizza oven shown in FIGS. 12-14, a turntable 68 is provided with a construction similar to that shown in FIG. 10 with 90° segments of the support rods 37 mounted together in units which may be inverted like the panel 31 in FIG. 9 to facilitate cooking of both free pizzas and pizzas which are cooked on pans.

The turntable has upstanding walls 45 which have a proper height to close doorways 70 in the interior heating chamber 72 of the oven (FIG. 14). The interior chamber is bounded by vertical and horizontal panels 74 and 76 and corner panels 78, and additional vertical and horizontal panels are provided defining chambers 80 containing high output heaters 82. A circulating fan 84 is mounted in one corner of the unit driven by electrical motor 86 for circulating air along closed paths indicated by the arrows in FIGS. 12-14 from the fan upwardly through and around the turntable, hence through openings 88 in the corner panel 78 through downwardly direct openings 90 in horizontal panels 76, hence across the heaters 82 and back to the input side of the fan 84.

It will be noted particularly in FIG. 14 that the entire oven has a rectangular vertical cross-section with a flat top and bottom which permits multiple ovens to be stacked upon each other.

The exterior walls of the oven are provided with conventional insulation not shown and conventional thermostatic controls are provided for the heaters 82. Conventional electrical controls are provided for rotating the platform 86 intermittently to move pizzas into and out of the ovens quickly during load cycles which are short compared to the intervening baking cycles during which the platform is stationary. Preferably the periods during which the platform is at rest are at least five times as long as the periods during which the platform is in motion.

Typically several pizzas may be loaded on one quadrant of the platform and the platform operated intermittently to rotate the platform 90° during a period of five seconds approximately every two minutes. Operated in this way, each individual pizza receives approximately a six minute baking cycle under the influence of the intense heat of the closed cycle heated and reheated air stream, and the oven will produce pizzas at a rate of thirty pizzas an hour with three pizzas on each quadrant. Obviously cooking time and product can be varied. If desirable, a finishing oven may be included to complete the baking cycle of any particular pizza which requires baking for an extended period of time. Conveniently, such a finishing oven may be provided by providing a chamber on the top wall of the oven which receives a part of the circulating air stream of the oven with an external door to the chamber through which pizzas can be placed into the oven for short periods of time.

We claim:
1. An automatic pizza oven comprising
 (a) a frame,
 (b) a generally circular pizza support mounted on the frame for rotation about a generally vertical axis,
 (c) upstanding generally radial walls on said support dividing said support into a plurality of equal arcuate segments,
 (d) housing means on said frame surrounding said support defining an oven area which encloses a plurality of the accurate segments and an access area on top of at least one of one of the segments with the housing means defining doorways between the oven and access areas and with the doorways closely interfitting with the radial walls whereby the radial walls form doors closing the doorways,
 (e) closed circuit heating and circulating means for heating air in said oven area and circulating the heated air throughout the oven area, and
 (f) intermittent drive means for starting rotation of the pizza support on the frame, rotating the pizza support through an integral multiple of the arcuate extent of one of said segments and then stopping rotation of the support.

2. The automatic pizza oven of claim 1 in which each of said segments is 90°, said oven area extends through 270° and said access area extends through 90°, and said intermittent drive means comprises means for rotating said pizza support continually through regular alternative intervals when the support is moving and stopping with the duration of the stopped intervals of motion being at least five times the duration of the intervals of motion.

3. A progressive oven comprising a frame, a generally horizontal rotor mounted on the frame for rotation about a generally vertical axis, radial means for radially dividing said rotor into sectors, wall means cooperating with the radial dividers of said rotor for defining an enclosed oven chamber, means for heating air, means for circulating air over said heating means and through said oven chamber, and means for rotating said rotor about said axis.

4. A device as in claim 3 including means for operating said rotating means intermittently.

5. A device as in claim 3 including means for periodically advancing said rotor from one predetermined rotated position into a subsequent predetermined rotated position and for stopping said rotor between each of said predetermined rotated positions.

* * * * *